United States Patent [19]

Armstrong

[11] Patent Number: 4,797,878
[45] Date of Patent: Jan. 10, 1989

[54] MULTIPLE VIRTUAL MULTIPOINT MODEM USING TDM/TOKEN THROWING TECHNIQUE

[75] Inventor: Thomas Armstrong, Clearwater, Fla.
[73] Assignee: Paradyne Corporation, Largo, Fla.
[21] Appl. No.: 86,518
[22] Filed: Aug. 18, 1987
[51] Int. Cl.[4] .......................... H04J 3/16; G05B 23/02
[52] U.S. Cl. ................... 370/96; 340/825.08; 340/825.54
[58] Field of Search ............... 370/85, 96, 94, 86, 370/90; 340/825.08, 825.06, 825.54

[56] References Cited

U.S. PATENT DOCUMENTS

4,726,017 2/1988 Krum et al. ........................ 370/96

Primary Examiner—Douglas W. Olms
Assistant Examiner—Wellington Chin
Attorney, Agent, or Firm—Kane, Dalsimer, Sullivan, Kurucz, Levy, Eisele and Richard

[57] ABSTRACT

A system for use on communications channels such as telephone lines, makes use of a Token Throwing Multiplexer (TTM) whereby a plurality of multipoint networks each having a master or local station and one or more remote stations and each having a station located at a common site can function as substantially independent networks while using common modems and telephone lines. The TTM uses conventional time division multiplexing (TDM) techniques in the outbound direction. Contention for the inbound line is resolved by a token throwing technique, the current inbound user being the location and channel in possession of the outstanding token.

6 Claims, 6 Drawing Sheets

LINE RATE : 14600 bps.
CHANNEL A RATE : 7200 bps.
CHANNEL B RATE : 7200 bps.
TOKEN RATE : 200 bps.

| TRANS./HOUR | WAIT TIME | TOTAL TIME | 90 PERCENTILE |
|---|---|---|---|
| 0 | 0.5 | 2.5 | 2.6 |
| 100 | 0.5 | 2.5 | 2.6 |
| 200 | 0.5 | 2.5 | 2.6 |
| 300 | 0.6 | 2.6 | 2.6 |
| 400 | 0.6 | 2.6 | 2.7 |
| 500 | 0.6 | 2.6 | 2.7 |
| 600 | 0.6 | 2.6 | 2.7 |
| 700 | 0.6 | 2.6 | 2.7 |
| 800 | 0.6 | 2.6 | 2.7 |
| 900 | 0.6 | 2.6 | 2.8 |
| 1000 | 0.6 | 2.6 | 2.8 |
| 1100 | 0.6 | 2.6 | 2.8 |
| 1200 | 0.6 | 2.6 | 2.8 |
| 1300 | 0.6 | 2.6 | 2.9 |
| 1400 | 0.6 | 2.6 | 2.9 |
| 1500 | 0.6 | 2.6 | 2.9 |
| 1600 | 0.7 | 2.7 | 3.0 |
| 1700 | 0.7 | 2.7 | 3.0 |
| 1800 | 0.7 | 2.7 | 3.0 |
| 1900 | 0.7 | 2.7 | 3.1 |
| 2000 | 0.7 | 2.7 | 3.1 |

MULTIPLE VIRTUAL MULTIPOINT MODEM USING TDM/TOKEN THROWING TECHNIQUE

BACKGROUND OF THE INVENTION

1. Field Of The Invention

This invention relates to the use of a Token Throwing Multiplexer (TTM) which enables users of two independent communication systems having multipoint networks and sited at the same location to share a single modem/telephone line multipoint network.

2. Description Of The Prior Art

Figure 1:
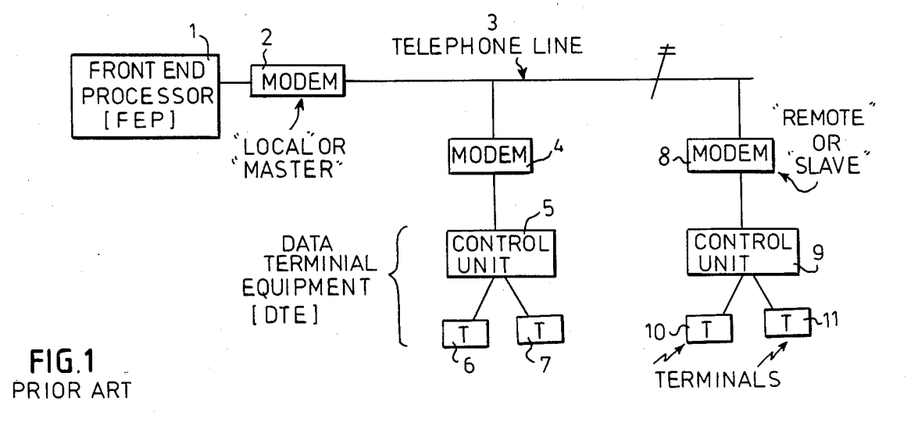
FIG. 1 is a schematic of a prior art multipoint system.

A very common modern communication system is that commonly referred to as multipoint. In the multipoint system, multiple users share a common party line to a central site. The central site broadcasts to all users, each of which has a unique address. Based on the address, users act only upon those messages which contain their unique address. The communication line back to the central site is also shared. However, the communication systems protocol prohibits more than one user from transmitting at any given instant in time. This protocol is usually referred to as pole/response. FIG. 1 illustrates such a system wherein the communication lines are telephone lines and the communication devices are modems. The operation of such a system is explained in detail in U.S. Pat. No. 4,335,464, which has the same inventor and assignee as the present invention and which is incorporated herein by reference. Other references which are relevant to the aforementioned system are "Data Communications", Dixon R. Doll, John Wiley & Sons, New York, 1978; "Introduction to Teleprocessing", James Martin, Prentice Hall, Englewood Cliffs, N.J. 1972; "Data Communications", G. Hell and R. Sarch, McGraw-Hill Publications Co., N.Y. 1983; and "Systems Analysis for Data Transmission", James Martin, Prentice Hall, Englewood Cliffs, N.J., 1972.

Figure 2:
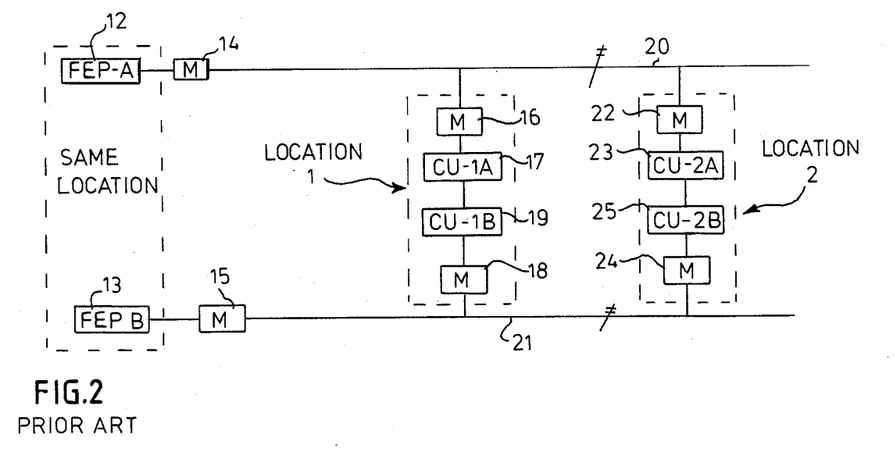
FIG. 2 is a schematic of a communications system having two multipoint systems sited at the same location.

As data communications requirements of businesses increase, many users have found the need for two or more multipoint networks at the same location as illustrated in FIG. 2. Such networks require two sets of modems and communication lines. The forementioned U.S. Pat. No. 4,335,464 provided a means whereby the two networks could be combined into one physical network of lines and modems and yet the system would appear to the user as two independent networks.

Figure 4:
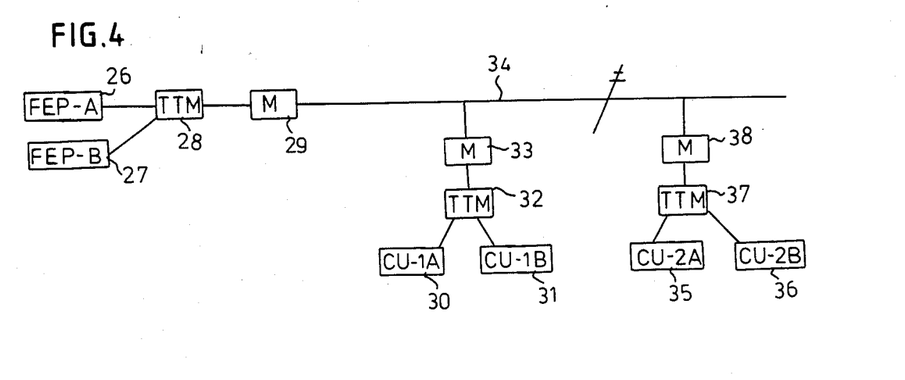
FIG. 4 is a schematic of two communications systems using token throwing multiplexer of the present invention as well as, modems and telephone lines.

The aforementioned U.S. Pat. No. 4,335,464 permitted the two systems sharing the lines and modems to operate totally independently by using Frequency Division Multiplexing Techniques as shown in FIG. 4. This system is somewhat inefficient with regard to bandwidth because of the requirement for a guard band between the frequency multiplexed channels. Thus, FDM modems of the type in the aforementioned patent attain a bit rate of 9600 bits per second whereas more modern telephone line modems such as the Paradyne Corporation model VHS14.4 operate at 14,400 bits per second.

SUMMARY OF THE INVENTION

A primary object of the present invention is to provide a multipoint system which appears as two relatively independent systems yet which requires only a single set of telephone lines and modems.

It is a further object of the present invention to provide a multipoint system which permits the virtually independent operation of two multipoint communication systems through the use of a token throwing multiplexer at each location.

Other objects and advantages will become apparent from the following description of the preferred embodiment of the invention.

The present invention provides a toke throwing multiplexer at each site and a multipoint communication system employing telephone lines and modems. The two users share the outbound lines and modems by means of time division multiplexing of the data stream by the TTMs. The two users also share the inbound line. Only one of the two is permitted use of the line at any particular instant. Contention for the line is resolved by the TDMs through the use of a token throwing technique. Only the user who has the token may use the inbound line.

DETAILED DESCRIPTION OF THE INVENTION

Before discussing the specific Figures, some definitions and assumptions will be made which will apply to the embodiments of the invention described hereinafter.

The OUTBOUND direction as defined by the direction of polls or inquiries from the central processing unit or front end processor (FEP) to (possibly) remotely located user terminals and/or control units (CUs). In other words, control of the communication link protocol is by means of the OUTBOUND communication link or direction. The INBOUND direction is from the CUs to the FEP. Data transfer may be in one or in both directions. Typical data communications systems which have an inbound and an outbound direction as defined herein employ BSC, SDLC, HDLC, PARS or IPARS protocols.

As to assumptions, the line protocols are polled/response with the polls being issued from a control unit or SEP at the master modem site. Typical protocols are BSC, SDLC, HDLC, PARS and IPARS.

Due to the nature of the above mentioned protocols, only one remote control unit on a channel A may attempt to send an inbound message at any particular time since the FEP algorithm precludes such an event. This is true for half duplex as well as full duplex protocols. For example, even in the case of full duplex SDLC the FEP controls the contention of the remote CUs. The same control of contention is true of channel B or additional channels.

The FEP has an internal timer (see FIG. 4, elements 40 and 41) such that it does not receive the response to a poll it waits a time T before issuing another poll. In the preferred embodiment which utilizes modems and telephone lines for communications, this timer value is at least 200 milliseconds. As discussed below in the section dealing with "error recovery", this is a desirable but not mandatory assumption.

FIG. 1 shows a conventional prior art multipoint system wherein front end processor 1 at the "local" or "master" station issues line protocols which can include information for training or retraining the channel with regard to such functions as equalizing the local and remote stations. Data at the local station is generated by a data terminal equipment (DTE) which comprises transmitter modules 6 and 7 as well as control unit 5. After passing through modem 4, the data is transmitted over telephone lines 3 to a "remote" or "slave" station which comprises transmitter modules 10 and 11 control unit 9, and modem 8.

FIG. 2 shows a prior art configuration of 2 FEPs 12 and 13 at the same location wherein FEP-A requires modems 14 and 16, control unit 17 and telephone lines 20 whereas FEP-B requires different modems 15 and 18, control unit 19, as well as telephone lines 21. Likewise, at a remote location the respective channels require separate respective combinations of modems in control units 22, 23 and 24, 25.

Figure 3:
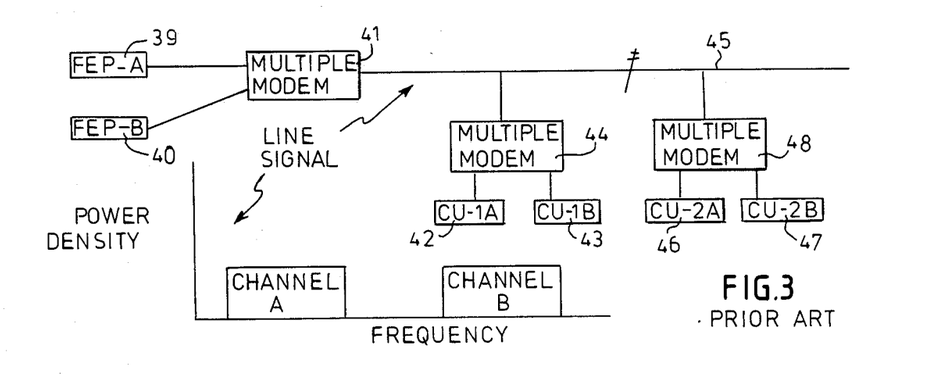
FIG. 3 is a schematic of two communications systems utilizing common modems and telephone lines in accordance with the aforementioned U.S. Pat. No. 4,335,464.

FIG. 3 shows a schematic of two systems sharing lines and modems to operate totally independently by using frequency multiplexing techniques such as are described in the aforementioned U.S. Pat. No. 4,335,464.

As stated previously, the price paid for using frequency division multiplexing is an inefficiency of bandwidth caused by the requirement for a guard band between the frequency multiplexed channels. As shown in FIG. 3, FEP-A 39 and FEP-B 40 both operate through multiple modem 41 and both transmit data over a telephone line 45 through control units 42 and 43 and multiple modem 44. Likewise, at the remote station, control unit 46 and 47 operate through a common multiple modem 48.

FIG. 4 discloses a token throwing multiplexer system implementation according to the present invention in which two independent multipoint communication systems A and B share a common set of telephone lines and modems. Each communication system operates in a normal manner and "almost independently" of the other system. The phrase "almost independently" means that in the preferred embodiment the outbound data rate is approximately ½ the normal rate and the inbound Request To Send and Clear To Send (RTS/CTS) delay may be greater than normal.

As shown in FIG. 4, FEP-A 26 and FEP-B 27 operate through a common token throwing multiplexer 28 and modem 29 to transmit protocol information to telephone line 34. Data is transmitted from control units 30 and 31 through token throwing multiplexer 32 and modem 33 to telephone lines 34. Likewise at the remote end data is generated by control unit 35 and 36 and conveyed through token throwing multiplexers 37 and modem 38 through telephone lines 34.

The operation of the circuits previously referred to will be described in detail in the following paragraph.

The output data is a pure time division multiplex (TDM) format with the A- data change channel, the B-data channel, and the token/sync channel-C being time division multiplexed. Numerous formats are possible such as ABABABAB -- TABABAB--- T etc. or AAAA ---- AABBBB---BBTAAA --- ABB, etc.

For convenience of implementation, the ratio of the A channel data rate and the B channel data rate should be expressible as a ratio of two integers. Also, the data rate of the token channel, T should divide into the A and B channel data rates an integral number of times. Examples:

|    | Channel A | Channel B | Channel T |
|----|-----------|-----------|-----------|
| 1. | 7200 bps  | 7200 bps  | 200 bps   |
| 2. | 6000 bps  | 4000 bps  | 400 bps   |
| 3. | 6000 bps  | 4000 bps  | 100 bps   |

Figure 5:
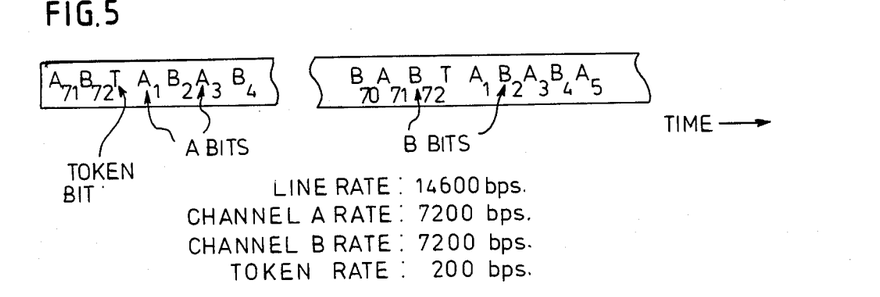
FIG. 5 is a graphical representation of the outbound bit sequence.

FIG. 5 illustrates example 1 above in which the outbound data rate is 14600 bps. Note that if the token channel data rate is 200 bps. as in the example, only 5 ms. at most occur between the time the master TTM wants to throw a token and is able to throw it. Just when a token is thrown is discussed below.

By alternating the A and B channel data the outbound data delay on each channel is minimized as shown in the previously referenced FIG. 5.

The data rate partitioning between the two channels need not be equal. For example, one channel could be given ⅗s of the bandwidt and the other ¼ by using a TDM data stream with three A bits to every one B bit as AAABAAABAAABTA etc. This may be extended to more than two channels and to other data rate combinations.

The format on the T channel is a pseudo random sequence such as is generated by a linear feedback shift register of length 7 of the equation; $1+X^6+X^7$. The theory and operation of these registers is well known and is discussed in "Coding and Information Theory", R. W. Hamming, Prentice Hall, Englewood Cliffs, N.J., 1980.

All remote demultiplexers search for and synchronize to the PRG sequence of T bits in the outbound TDM data stream. The techniques for TDM sync are straightforward and well known. Once in sync remote TTM demultiplexers output the appropriate A bits and B bits to the proper DTE. Also once in T bit synchronism the TTM demultiplexers check for errors in the known T stream PRG pattern. The presence of errors is used to signal the presence of a A or B token.

If the master mux wants to throw out an A token, a single bit in the outbound T stream is inverted. If a B token is to be thrown, two sequential bits are inverted. This idea may obviously be extended to 3, 4 or even more tokens. At the remoe mux, reception of a T pattern bit error is interpreted as an A Token. If then, for example, the master TTM inverts a single bit of the PRG, all remote demultiplexers will have an A token at nearly the same time. Excluding the unlikely case of a multipoint with a telephone attached drop on New York and a satellite drop on San Diego, the maximum difference token arrival would be with the same two locations connected by terrestrial lines and would be approximately 51 ms. This time is much too short for any FEP to issue two polls and therefore create a potential line clash due to the nearly simultaneous use of the same token by two locations.

Using one or two T bit errors to signal the throwing of a token obviously may lead to the detection of false tokens. In this unlikely event a line clash could occur and data may be lost. In any of the normal protocols cited above the FEP or CU would call for retransmission of the data. Of course the probability of this event could be reduced by requiring multiple T bit errors for a token.

A token is thrown every Td seconds or immediately after the master TTM observes LSD at the master modem to go from ON to OFF as discussed below.

With regard to inbound operation and from the above discussion, assume that all remote TTMs have detected a single T pattern error bit and interpreted this event as an A token. As soon as an A token is detected, each remote TTM immediately (within 1 bit time of the outbound direction clock) checks to determine if RTS on the A channel is ON. Due to the protocol, this may be true at only one remote TTM location. If RTS is OFF at a mux, the A token is immediately thrown away. If at some site, RTS is true on the A channel, CTS is turned on after a time period equal to the normal modem RTS/CTS time plus 8 bit times and the active CU is allowed to transmit. The remote mux uses the 8 bit times to prefix the message with a header identifying the message as a A channel response. One set of headers could be 01010101 for A and 10101010 for B. Reception of an erroneous header would cause the master mux to discard the message. In this event the FEP calls for retransmission of the message. Reception of a valid A header causes the master mux to send the incoming message out the A port to the FEP.

A strap selectable timer exists in the master TTM. The value of this timer, Td, is equal to the maximum time required to send a bit from the master TTM to any remote TTM and have the bit returned to the master TTM. This time may be determined empirically or may be measured via data scope devices, modem test sets, network management systems or FEP software. For the system shown in FIG. 4, the following parameters are required to model and analyze the operation of the system;

1. Terminal Delay-The delay between the time a control unit/terminal receives a poll or message and begins to transmit a response.
2. Modem Delay In-The time required for a single bit to pass from the modem transmit data input to the receive data output for the outbound modem.
3. Modem Delay Out-The time required for a single bit to pass from the modem transmit data input to the receive data output for the outbound modem.
4. Line Delay-The TELCO system line/carrier system delay in one direction. (Typically 1.7 ms per 100 miles.)
5. FEP Turnaround-The time required between the receipt of a poll response by the FEP and the transmission of another poll.
6. Modem RTS/CTS-The request to send/clear to send time of the inbound, controlled carrier modem.
7. Misc. Delay-Any extra delays incurred by the data in one direction. An example is that due to a point to point, multiplexed backbone which supports multipoint
8. Characters Out-The number of data characters in the outbound message which is a result of an inbound inquiry.
9. Rate Inbound-The data rate in the inbound direction.
10. Rate Outbound-The data rate in the outbound direction.
11. #Drops-The number of remote multipoint modems.
12. #Polls/Minute-The maximum number of polls per minute as determined by the FEP software polling rate limitation.
13. BER Inbound-The bit error rate in the inbound direction.
14. BER Outbound-The bit error rate in the outbound direction.
15. CPU Processing Time-The time required by the host to process a transaction and send the result to the FEP. This is assumed to be constant for the purpose of this model.
16. FEP Wait Time-The PEP stops and waits if it does not detect a response to a poll.
17. Type of Service-The type of variation in the time required to transmit the outbound message. It is set to constant for modems, DSUs and modems/DSUs with TDM multiplexers. It is set to exponential if system includes statistical multiplexers.

System operation for the network of FIG. 4 is documented in detail in the references mentioned in "Description Of The Prior Art" and as a result will only be briefly described herein.

The multipoint communication system is assumed to utilize a polling type protocol such as BSC or SDLC. Normally the system is in a polling mode with polls being sent from the Front End Processor (FEP) to the terminal Control Units (CUs). Normally the responses to the polls are negative, that is, the CU does not have any data to send to the FEP. If a positive response or inquiry is received by the FEP, the inquiry is handed to the Central Processing Unit (CPU) host and the CPU Processing Time timer starts. Polling continues until the transaction data is handed to the FEP at which time a specific poll is sent to the appropriate Control Unit, followed by the transaction data. If received correctly, the CU sends a positive response thereby ending the cycle. If received incorrectly, the CU sends a negative response which causes the FEP to retransmit the data. The transaction data may be transferred in the form of one or multiple blocks.

In the polling mode, if the FEP does not receive a reply, the FEP pauses and waits the FEP Wait Time.

Figure 6:
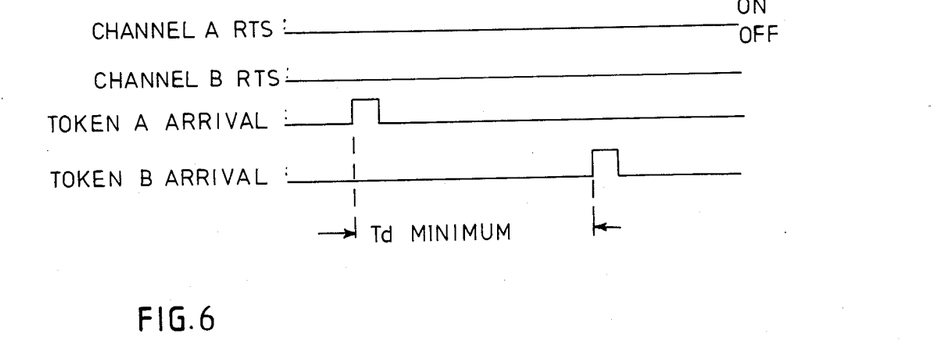
FIG. 6 is a graphical representation of the inbound sequenching during a period of no data transmission.
Figure 7:
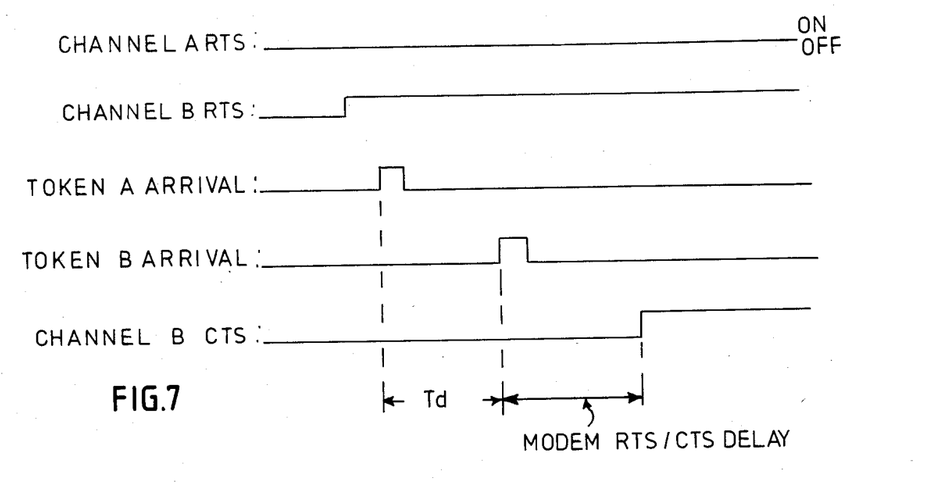
FIG. 7 is a graphical representation of the inbound sequencing for an actively transmitting channel B.

The sequencing of tokens and RTS from the CUs at a remote location are shown in FIG. 6 for the case in which neither CU wants to be active. FIG. 7 shows the sequencing of tokens, RTS and CTS for the case in which one CU is active.

Figure 8:
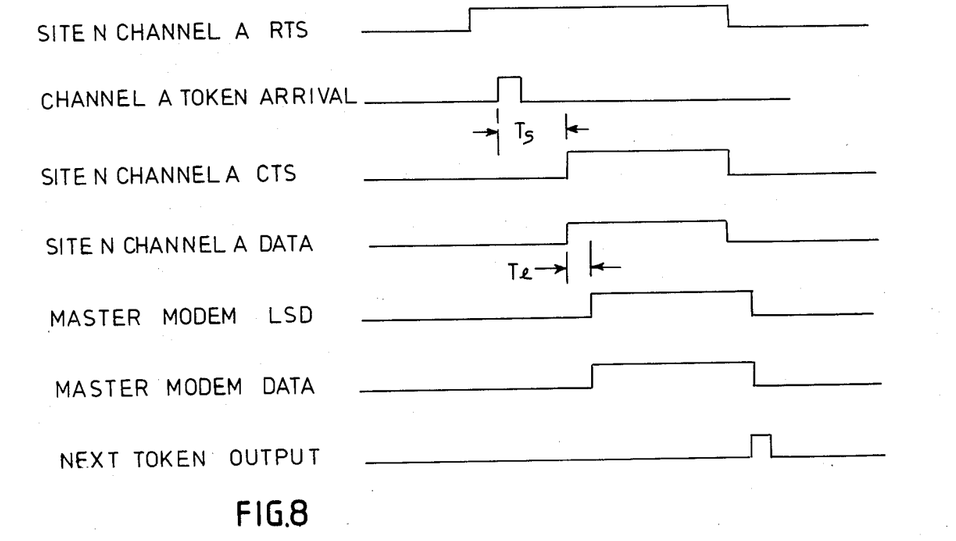
FIG. 8 is a graphical representation of remote TTM and master modem signal sequencing.

See FIG. 8 for the sequencing of remote CUs control signals and the master modem control signals when a remote CU sends inbound data. As shown in the Figure, if LSD goes ON at the master modem within a period Td after the A token was sent, another A token or a B token is sent only after LSD goes OFF. This event corresponds to the use of the token by a remote TTM and its attached CU. In this case the appropriate Cu used the inbound data channel for transmission of control information and/or data.

If LSD does not go ON after a period Td, this means that no CU used that particular token and the token was discarded by all TTMs. In this case another A token or B token is sent out since the waiting time Td has expired. it is important to wait at least the time Td to guarantee that all sites have discarded the last thrown token.

When a token is received by a remote TTM, it is immediately used or thrown away. If used, the master modem will detect LSD ON within a period Td. If thrown away LSD will not be detected within this period. Due to this process only one token may be capable of being acted upon in the entire system and hence simultaneous action of two remote multiplexers upon two tokens is not possible. Such an event is undesirable as it would cause a clash on the inbound multipoint line. Error recovery in the event of such a situation is detailed below.

Due to the data line protocol, only one remote CU on the A channel and only one remote CU on the B channel can attempt to raise RTS at any particular instant in time. (In practice with the parameters of normal multipoint systems, this time is not instantaneous but rather is on the order of 100 ms. A channel clash by two different sites is therefore not possible. Likewise for B channel clashes. Therefore A channel clashes, B channel clashes and A-B channel clashes are not possible. A channel clashes and B channel clashes are prohibited by the FEP protocol as discussed above and A to B or B to A clashes are prohibited by the token. (One key idea of the invention is that the token is tossed away if it can't be used immediately.)

To summarize operation of the inbound direction, if an A token is sent out two events may occur. The A token may be discarded by all sites and be unused or the A token may be used by a single site. If the token is used, that particular site has total use of the inbound line and sends in its respective data and/or control information. Assuming that after the A token a B token is sent, the identical scenario may be used to describe B channel operation.

The order of tokens can be used to control the traffic rates on the respective channels. ABABAB for a 50/50 mix or AABAAB for a 67/33 mix, for example.

With regard to error recovery, all modern day, data communication protocols allow for the recovery from events caused by data channel bit errors. Two events which can be caused by line errors in normal multipoint systems and in the TTM system of the preferred embodiment are the simultaneous transmission of two CUs or the loss of an inbound data block due the occurence of an invalid or uncorrectable TTM inbound data header. In both cases, i.e., loss of data or garbled data, the FEP issues a command to the last addressed CU to repeat the last transmission whereupon the system continues to operate normally.

With regard to outbound incremental delay, the data delays in the outbound direction are equal to the mux/demux delay of the TTM plus the normal modem throughput delay and the telephone line delays. The mux/demux delay should be less than two bit times at the mux and two at the demux if the A and B channels are alternated as ABABABAB. Such incremental delay is negligible since for example, at 7200 bps four bit times equals 0.56 ms. and at 12000 bps equals 0.33 ms.

With regard to inbound incremental delay the worst incremental inbound delay occurs if a CU on the B channel raises RTS in order to respond to a poll from the FEP just after the corresponding TTM has discarded a B token and A channel Digital Terminal Equipment (DTE) has raised RTS and is waiting to send an inbound message. The table below illustrates the worst case incremental delay for several typical implementations and data rates.

| INBOUND RATE | MESSAGE LENGTH | DELAY |
|---|---|---|
| 9600 bps | 48 bytes | 207 ms |
| 9600 bps | 128 bytes | 268 ms |
| 12000 bps | 48 bytes | 198 ms |
| 12000 bps | 128 bytes | 241 ms |

Assume the B channel would normally operate at a polling rate of 600 polls per minute and a transaction rate of 1000 transactions per hour. The normal poll to poll time would be 100 ms and the average null response to a poll would be the same. On an average then the normal poll to poll time has been increased from 100 ms. to $100/2+202/2=151$ ms. Such an average increment in the poll to poll time would increase the average response time of a seven drop system by approximately 0.2 seconds.

Actually the analysis was an impossible worst case since the model assumed that the A channel sent a block of 128 bits each time the B channel was ready to send. In practice, a heavy A channel loading would be 1000 transactions per minute. Hence in only 17 out of 600 occurences would 128 bytes be sent while in 583 of the occurences only 6 bytes would be sent in on the A channel assuming the common SDLC protocol.

If the A token were not used, a B token could be sent after a time Td and the incremental delay would be approximately 1.5 times Td minus the remote modem RTS/CTS time since a time Td elapses between tokens and a time Td/2 minus the modem RTS/CTS time is required to send a token outbound. A representative value of Td is 80 ms and the delay in this case can be shown to be 100 ms. This corresponds to the incremental B channel delay when the A channel is not active.

Figure 9:
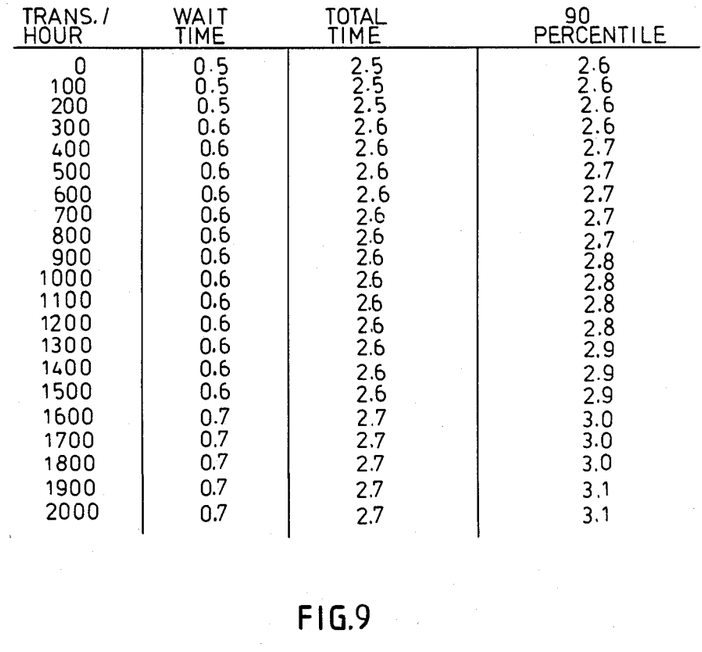
FIG. 9 shows a sample multipoint computer simulation run.

FIG. 9 shows a computer simulation run for a typical multipoint network and illustrates the values for the network parameters which were discussed previously.

The simulation models the multipoint network as a single server queue with constant service times and a random (often called Poisson) arrival pattern. A statistical multiplexer may be modeled. An excellent discussion of the mathematics and operation of such a system is given in the aforementioned "Systems Analysis For Data Transmission" article.

The outputs of the queueing simulation are as follows:
1. Transactions per Hour-The number of transactions per hour the system is supporting. This is an average value.
2. Wait Time-The average time from the entry of an inquiry by a terminal operator and the beginning of the display of a response on the terminal. If the display is "almost instantaneous", this is the same as keyboard unlock. This value is an average time and does not include CPU Processing Time. See Total Time below.
3. Total Time-This is the Wait Time plus the CPU Processing Time or the total observable response time of the system as observed by an operator.
4. 90 Percentile Time-The time which the observed total response time of the system exceeds in only 1 in 10 trials. Conversely, 90% of the observed response times are less than this value.

5. Throughput-The net BPS of the outbound path devoted to sending transaction data based on a maximally loaded system. It includes the polling delay penalty.
6. Transaction Time-The time required to poll a control unit, send a message out correctly, and receive a positive response.
7. T Minimum-Average-The average minimum response time as observed by a terminal operator. The minimum observable response time would be the Transaction Time as defined above plus the CPU Processing Time.
8. # Polls/Minute-The maximum polling rate which may be achieved by the system when no transactions are occurring. The limitation may be due to the physical system parameters or to the FEP # Polls/Minute limitation, whichever is less.
9. Maximum Transactions (per hour) -The maximum transaction rate the system is capable of supporting in a steady state. Note that at this rate the expected Wait Time and Total Time would be infinite.

With respect to determination of the delay parameter Td, Td is defined as the maximum time required to send a bit of data from the FEP to a CU and have the data returned to the FEP from the CU. Using typical values for the system parameters given in FIG. 9, Td may be calculated by summing the following delays:

| DELAY | TYPICAL VALUE |
|---|---|
| Modem delay out | 12 ms |
| Line delay out | 5 ms |
| Terminal delay | 5 ms |
| Modem RTS/CTS | 20 ms |
| Modem delay in | 12 ms |
| Line delay in | 5 ms |

Summing the delays shown above yields a total of 59 ms. Hence for this network a safe value of Td is 75 ms.

Figure 10:
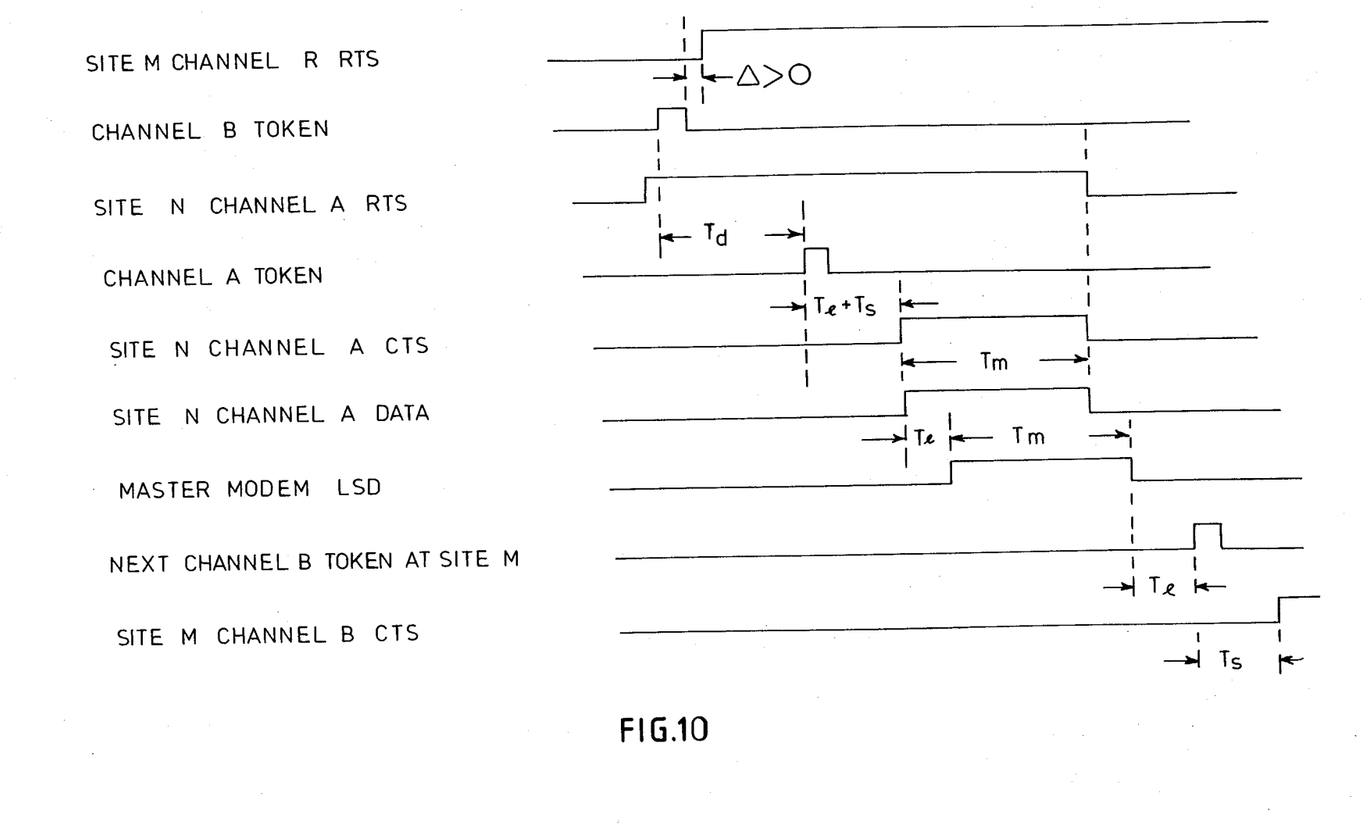
FIG. 10 is a graphical represenation showing the sequencing necessary to determine the worst case channel delay caused by interaction.
Figure 11:
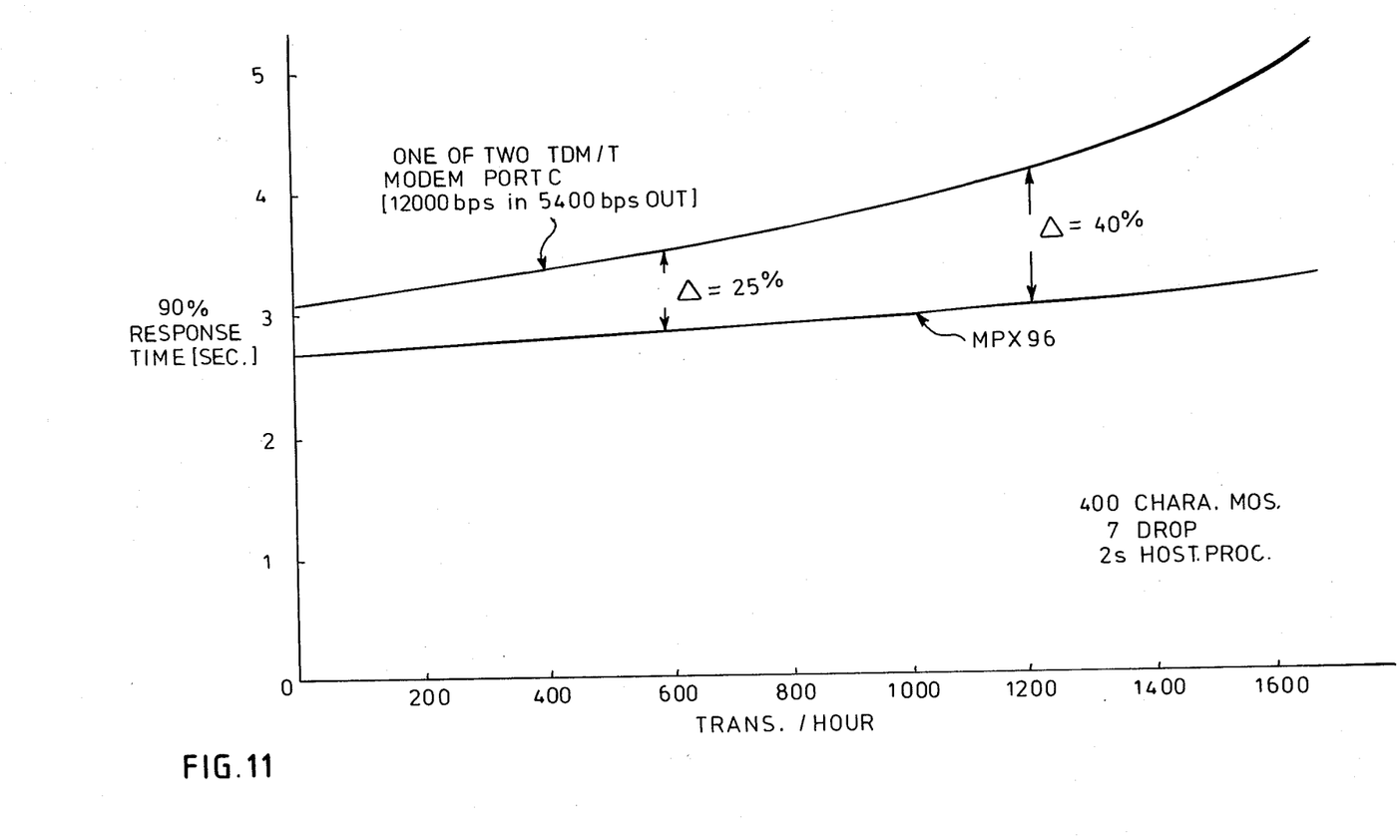
FIG. 11 is a graphical representation showing the 90 percentile of FIG. 9.

A derivation of the worst case incremental delay follows. FIG. 10 shows the control signals and timing diagrams which are necessary for the derivation of the worst case incremental delay caused by use of the TTM. Specifically, the delay is defined as the increase in user response time caused by sharing the communication line by channels A and B.

Based on the previous discussion of multipoint parameters, and the typical multipoint system which is simulated in FIG. 9, assume that channel A is inactive, channel B has 7 drops and a normal polling rate of 600 polls per minute. Then the system polls at 10 polls per second and on the average, site M of channel B must wait 3.5*0.1 sec or 0.35 seconds to be polled. A worst case polling time is 7*0.1 or 0.7 seconds. Therefore, ignoring the effect of channel B blocking channel B, normally site M would wait 0.35 seconds for a poll or in a worst case would wait 0.7 seconds.

The worst case of incremental delay on channel B occurs when channel B RTS goes ON just after a B token has been thrown out to the remote TTMs and discarded. The token had to be discarded since on channel B, site M was assumed to turn RTS on just after the token was discarded. Protocol prohibits two locations having RTS ON at the same time. So site M has no token and RTS is ON as shown in lines 1 and 2. Now at some site, assume channel A RTS goes ON. At the master site, the TTM throws out an A token after a time period Td (since no B transmitted LSD was ever ON). The token arrives at site N T1 seconds later. When the A token arrives at site N where the channel A RTS is ON, it is immediately acted upon the CTS is turned on to the DTE after a time period, TS, corresponding to the modem TRS/CTS set up time. Hence, at site N, channel A CTS goes ON T1+Ts seconds after the token is line 1 was discarded. See lines 3, 4 and 5.

When site N CTS goes ON data transfer immediately begins, as shown on line 6 of FIG. 10. After a time T1, the master modem LSD goes ON as shown on line 7. Data transfer requires a time Tm. After the data is transferred, the master modem LSD goes OFF and a channel B token is finally sent, as shown on lines 6 and 7. The token again requires T1 seconds to arrive at site N and Ts seconds later CTS is turned ON.

Therefore, the incremental delay of channel B caused by A being active is Td+T1+Ts+T1+Tm+T1+Ts=Ti. Since CTS at the site would always be delayed Ts seconds, the worst case incremental delay is Ti−Ts=Tt.

Assume that the line rate is 12000 bps and the modems are as used in the simulation. T1 can therefore be shown to be 5 ms+12 ms for the line delay and modem throughput delay respectively. Using the modems of the example, T1 is 20 ms. The time for the transfer of a 128 byte message equals 135*8/120000=90 ms. Note that under SDLC protocol 6 additional bytes are required for control. Also, 1 byte is required by the TTMs to prefix the channel identifier.

Substituting in the formula for Td yields Tt=Td+T1+Ts+T1+Tm+T1=80+17+20+17+90+17=241 ms.

The invention is not intended to be limited to the particular embodiments specifically described, since many modifications are possible without departing from the spirit or the scope of this invention.

What is claimed is:
1. A communications system for use on communication channels comprising:
   a plurality of front end processors at a master station, each of said front end processors being dedicated to a separate communications network;
   a master token transmitter multiplexer having a plurality of inputs, each of said inputs connected to an output of one of said front end processors, having means for generating a token bit stream and having an output which continuously timedivision multiplexes bits of said inputs and said token bit stream in a predetermined sequence;
   means for communicating data over the communications channel, input to said transmitting means being said output of said master token transmitter; and
   a plurality of remote stations, each of said remote stations comprising a plurality of control units, one control unit corresponding to each of said dedicated front end processors, a remote means for communicating with the communications channel, and a remote token transmitter multiplexer responsive to said token bit stream for time division multiplexing output between said control units and of said remote communicating means.
2. The system of claim 1 wherein said master token transmitter multiplexer issues line protocols of the poll/response type such as BSC, SDLC, HDLC, PARS, and IPARS protocols.
3. The system of claim 1 wherein only one of said station having received a token from said master token transmitter multiplexer at said master station may transmit information on an inbound line of said communications channel.

4. The system of claim 1 wherein the communicating means are modems and the communications channel is a telephone line.

5. The system of claim 1 wherein said front end processors each contain a timer which causes the front end processor to wait a certain time before sending a second polling signal if it receives no response to a first polling signal.

6. The system of claim 1 wherein said token bit stream is a pseudo random sequence such as is generated by a linear feedback shift register.

* * * * *